US012774768B2

(12) United States Patent
Perherin et al.

(10) Patent No.: US 12,774,768 B2
(45) Date of Patent: Oct. 27, 2026

(54) FLUID CIRCUIT AND METHOD FOR CONNECTING PIPES OF SUCH A FLUID CIRCUIT

(71) Applicant: AIRBUS ATLANTIC, Rochefort (FR)

(72) Inventors: Daniel Perherin, Saint Nazaire (FR); Daniel Boulze, Aussonne (FR); Dimitri Rouyard, Les Moutiers en Rez (FR)

(73) Assignee: AIRBUS ATLANTIC, Rochefort (FR)

( * ) Notice: Subject to any disclaimer, the term of this patent is extended or adjusted under 35 U.S.C. 154(b) by 101 days.

(21) Appl. No.: 18/571,581

(22) PCT Filed: Jul. 4, 2022

(86) PCT No.: PCT/EP2022/068375
§ 371 (c)(1),
(2) Date: Dec. 18, 2023

(87) PCT Pub. No.: WO2023/280741
PCT Pub. Date: Jan. 12, 2023

(65) Prior Publication Data
US 2024/0280198 A1 Aug. 22, 2024

(30) Foreign Application Priority Data
Jul. 7, 2021 (FR) ....................................... 2107360

(51) Int. Cl.
*F16L 25/12* (2006.01)
*F16L 27/113* (2006.01)

(52) U.S. Cl.
CPC ............. *F16L 25/12* (2013.01); *F16L 27/113* (2013.01)

(58) Field of Classification Search
CPC ..... F16L 27/1273; F16L 25/12; F16L 27/113; F16L 27/125; F16L 37/107; F16L 19/02; F16L 19/0206; F16L 19/025
See application file for complete search history.

(56) References Cited

U.S. PATENT DOCUMENTS 96,962 A * 11/1869 Reinshagen .......... F16L 13/141 285/330
1,833,319 A * 11/1931 Damsel ................. F16L 27/113 285/226
(Continued)

FOREIGN PATENT DOCUMENTS

CH 604067 A5 * 8/1978 .............. F16L 25/12
DE 2209117 A1 * 9/1972
(Continued)

OTHER PUBLICATIONS

Search Report from the French Intellectual Property Office on corresponding FR application (FR2107360) dated Mar. 11, 2022.
(Continued)

*Primary Examiner* — Matthew Troutman
*Assistant Examiner* — James A Linford
(74) *Attorney, Agent, or Firm* — Alumen IP Law PC

(57) ABSTRACT

A fluid circuit, in particular for an aircraft, comprising at least one first duct (1) and a first connecting member (5), at least one second duct (2) and a second connecting member (6), a connector piece (3), for joining the two connection ends of the ducts (1, 2) in a leaktight manner, comprising a central sleeve (4) configured to cooperate, at a first end, with the first connecting member (5) and, at a second end, with the second connecting member (6), the central sleeve (4) having a plurality of flexible teeth (41) in order to correct any error in alignment between the first axis (X1) and the second axis (X2).

19 Claims, 6 Drawing Sheets

(56) References Cited

U.S. PATENT DOCUMENTS

| | | | | | |
|---|---|---|---|---|---|
| 3,596,934 | A | | 8/1971 | De Cenzo | |
| 5,595,368 | A | * | 1/1997 | Bogdany | F16L 19/02 285/341 |
| 7,828,339 | B2 | | 11/2010 | Dole | |
| 2014/0265303 | A1 | * | 9/2014 | Ismert | F16L 37/123 285/12 |

FOREIGN PATENT DOCUMENTS

| | | | | | |
|---|---|---|---|---|---|
| EP | 2827042 | A1 | * | 1/2015 | F16L 59/181 |
| FR | 383257 | A | * | 3/1908 | |
| FR | 3082587 | A1 | | 12/2019 | |
| FR | 3102529 | A1 | | 4/2021 | |
| GB | 207372 | A | | 11/1923 | |

OTHER PUBLICATIONS

International Search Report and Written Opinion on corresponding PCT application (PCT/EP2022/068375) from International Searching Authority (EPO) dated Sep. 1, 2022.

* cited by examiner

FLUID CIRCUIT AND METHOD FOR CONNECTING PIPES OF SUCH A FLUID CIRCUIT

TECHNICAL FIELD

The present invention relates to the field of fluid circuits in an aircraft, for example, a drinking water, wastewater, drainage circuit, etc. The invention also relates to the connection of pipes of such a fluid circuit.

In a known manner, a fluid circuit comprises a plurality of pipes mechanically and fluidically linked to each other. When setting up a fluid circuit in an aircraft, the pipes are independently made integral with the structure of the aircraft and then fluidly connected to each other. In other words, the pipes are not movable relative to each other, but fixed when connected. Pipes are subject to thermal expansion. In practice, a small axial clearance can be contemplated to take account of relative deformations or movements between the pipes and the surrounding supporting structure. To connect a first pipe to a second pipe, it is known to use a linking connector that has to be mounted at the interface between the first pipe and the second pipe in order to ensure a sealed connection.

As an example, with reference to FIGS. 1 and 2, a first pipe 101 and a second pipe 102 are represented which extend longitudinally along an axis X and which are sealingly linked by a connector 103 capable of translating axially on the first pipe 101 to cooperate with the end of the second pipe 102. Each pipe 101, 102 comprises a connection end 111, 121 to which a connection element 112, 122 is mounted.

In practice, with reference to FIG. 3, when the pipes 101, 102 are positioned, it is difficult to guarantee that their connection ends 111, 121 are perfectly rectilinear due to manufacturing tolerances, pre-bending steps, mounting tolerances, etc. Misalignment is even more likely to occur when the pipes 101, 102 are made of thermoplastic material. Due to this misalignment, it is difficult to position the linking connector 103 and ensure sealing.

An immediate solution would be to provide a high rigidity connector 103 which would stress the connection ends 111, 121 of the pipes 101, 102 in order to align them axially. A high rigidity connector 103 would require applying significant forces to the pipes 101, 102 during mounting and would not allow absorbing the expansion effects axially. It is known from document U.S. Pat. No. 3,596,934 a tube coupling system according to prior art.

Thus, the invention aims to eliminate at least some of these drawbacks.

SUMMARY

The invention relates to a fluid circuit, in particular for aircraft, comprising

- at least one first pipe comprising a first connection end, extending along a first axis and defining an internal surface and an external surface, the first connection end comprising a first peripheral connection element as well as a first linking member translationally and rotationally free about the first axis,
- at least one second pipe comprising a second connection end, extending along a second axis and defining an internal surface and an external surface, the second connection end comprising a second peripheral connection element as well as a second linking member translationally and rotationally free about the second axis, the connection ends of the pipes being fixed and spaced apart by an axial connection clearance,
- a linking connector, to sealingly link the two connection ends, comprising:
  - a central sleeve comprising a peripheral casing adapted to slide along the second axis, the central sleeve being configured to cooperate, at a first end, with the first linking member and, at a second end, with the second linking member,
  - the central sleeve comprising a plurality of flexible teeth configured to cooperate with the second peripheral connection element in order to correct a possible misalignment between the first axis and the second axis.

By means of the invention, the central sleeve can be conveniently manufactured and then linked to the linking members later. Advantageously, the flexible teeth allow the central sleeve to be guided while allowing its tilt during connection, which makes it possible to conveniently compensate for any misalignment.

Preferably, the flexible teeth of the central sleeve are circumferentially distributed. Thus, cooperation is optimum for any type of misalignment.

Preferably, the second linking member comprises a plurality of flexible teeth configured to cooperate with the second connection end in order to correct a possible misalignment between the first axis and the second axis when the second linking member cooperates with the central sleeve. The teeth of the second linking member also make it possible to compensate for misalignment. Thus, forces related to misalignment are optimally distributed to limit the risk of failure and breakage.

Preferably, the first linking member comprises a plurality of flexible teeth configured to cooperate with the first connection end in order to correct a possible misalignment between the first axis and the second axis when the first linking member cooperates with the central sleeve. Preferably, the flexible teeth are circumferentially distributed.

Preferably, the first linking member comprises a corrugated linking portion linking the flexible teeth. Such a linking portion provides flexibility to the teeth and allows for clearance.

According to a preferred aspect, the first linking member comprises openings, preferably cylindrical, formed in the corrugated linking portion, to spread the flexible teeth apart. In addition to improved flexibility, such openings reduce mechanical stresses in the first linking member.

Preferably, the linking portion has an external elbow having a first radius of curvature and an internal elbow having a second radius of curvature less than the first radius of curvature so as to ensure flexibility and damping making it possible to compensate for misalignments without generating stresses.

According to one aspect, each flexible tooth is tilted towards the first axis by an angle of between 2° and 5° in order to ensure progressive contact with the first pipe while limiting the mounting forces.

Preferably, the flexible teeth of the second linking member are circumferentially distributed.

According to one aspect of the invention, the first linking member and the second linking member are identical. This facilitates industrialization. In addition, the forces applied to the connector are analogous at both ends.

Preferably, at least one end of the central sleeve comprises a clamping device configured to cooperate with a linking member. A clamping device allows axial clamping to guarantee the durability of the connection.

According to a preferred aspect, the clamping device comprises at least one guide slot, preferably, so as to allow quarter-turn clamping. Advantageously, an axial clamping is conveniently carried out by guided rotation of a linking member. A bayonet-type clamping is quick and convenient.

According to one aspect of the invention, the linking connector comprises a first sealing member and a second sealing member configured to cooperate respectively with the first connection end and the second connection end in the connection position. Thus, sealing is guaranteed.

Preferably, the sealing members have different diameters. When the sleeve is made by thermoplastic injection, a relief angle is provided so as to allow demolding the same. The sealing members have different diameters in order to ensure optimum sealing taking account of this relief angle.

The invention also relates to an aircraft comprising a fluid circuit as set forth previously, wherein the first pipe and the second pipe are made integral with a structure of the aircraft, the connection ends of the pipes being fixed and spaced apart by an axial connection clearance.

The invention also relates to a method for connecting at least a first pipe and a second pipe by means of a linking connector of a fluid circuit as set forth previously, the connection ends of the pipes being fixed and spaced apart by an axial connection clearance, the linking connector extending over a connection end of a pipe, the method comprising a step of moving the central sleeve of the linking connector between the connection ends, the flexible teeth of the central sleeve cooperating with the second peripheral connection element in order to correct a possible misalignment between the first axis and the second axis.

Preferably, the method comprises a step of cooperating the second linking member with the central sleeve so as to lock the linking connector.

BRIEF DESCRIPTION OF THE DRAWINGS

The invention will be better understood upon reading the following description, given as an example, and referring to the following figures, given as non-limiting examples, in which identical references are given to similar objects.

It should be noted that the figures set out the invention in detail in order to implement the invention, said figures may of course be used to better define the invention where applicable.

DETAILED DESCRIPTION

A fluid circuit according to the invention intended for aeronautical use, in particular, for the transport of fuel, water and oxygen, air, fire-retardant gas, refrigeration, etc., will now be set forth.

In this example, the fluid circuit comprises a plurality of pipes that are coordinated with each other in order to guide a fluid. For an aeronautical application, the individual pipes are firstly made integral with a structure of the aircraft, and then secondly connected to each other.

Subsequently, the invention will be set forth for the connection of two pipes of a fluid circuit. Nonetheless, the invention also applies to the connection of more than two pipes, in particular three pipes.

Figure 1:
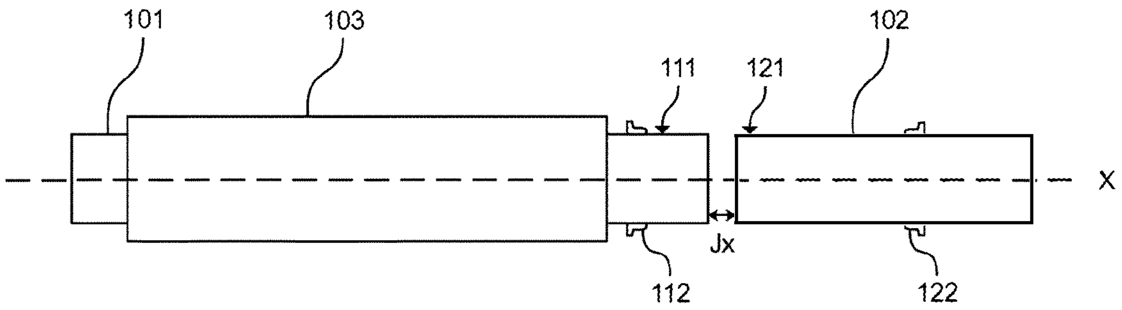
FIG. 1 is a schematic representation of two pipes with a connector in the stand-by position.
Figure 2:
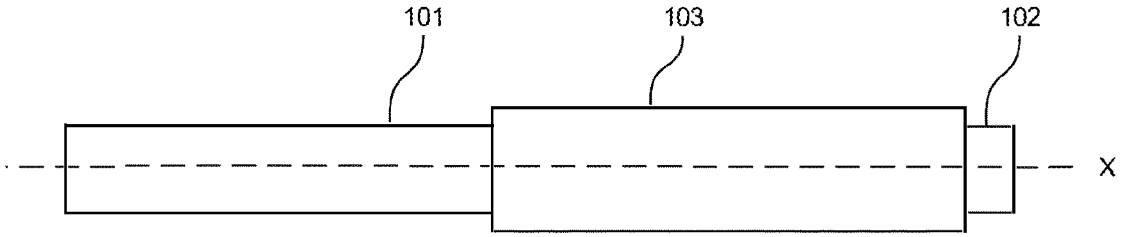
FIG. 2 is a schematic representation of two pipes with a connector in the mounted position.
Figure 3:
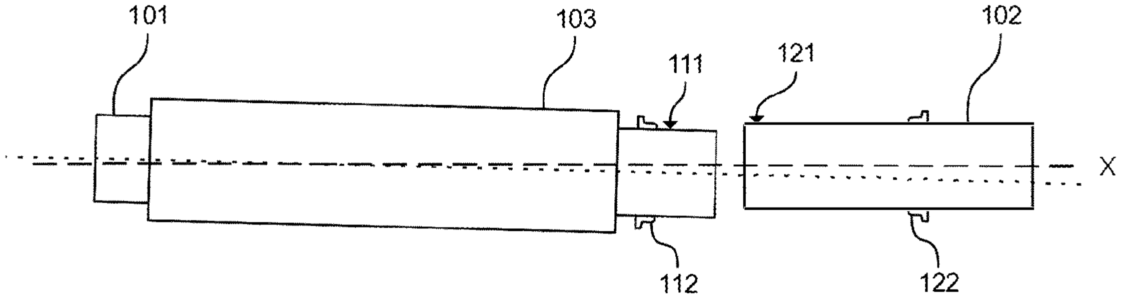
FIG. 3 is a schematic representation of two pipes whose ends are not axially aligned.
Figure 4:
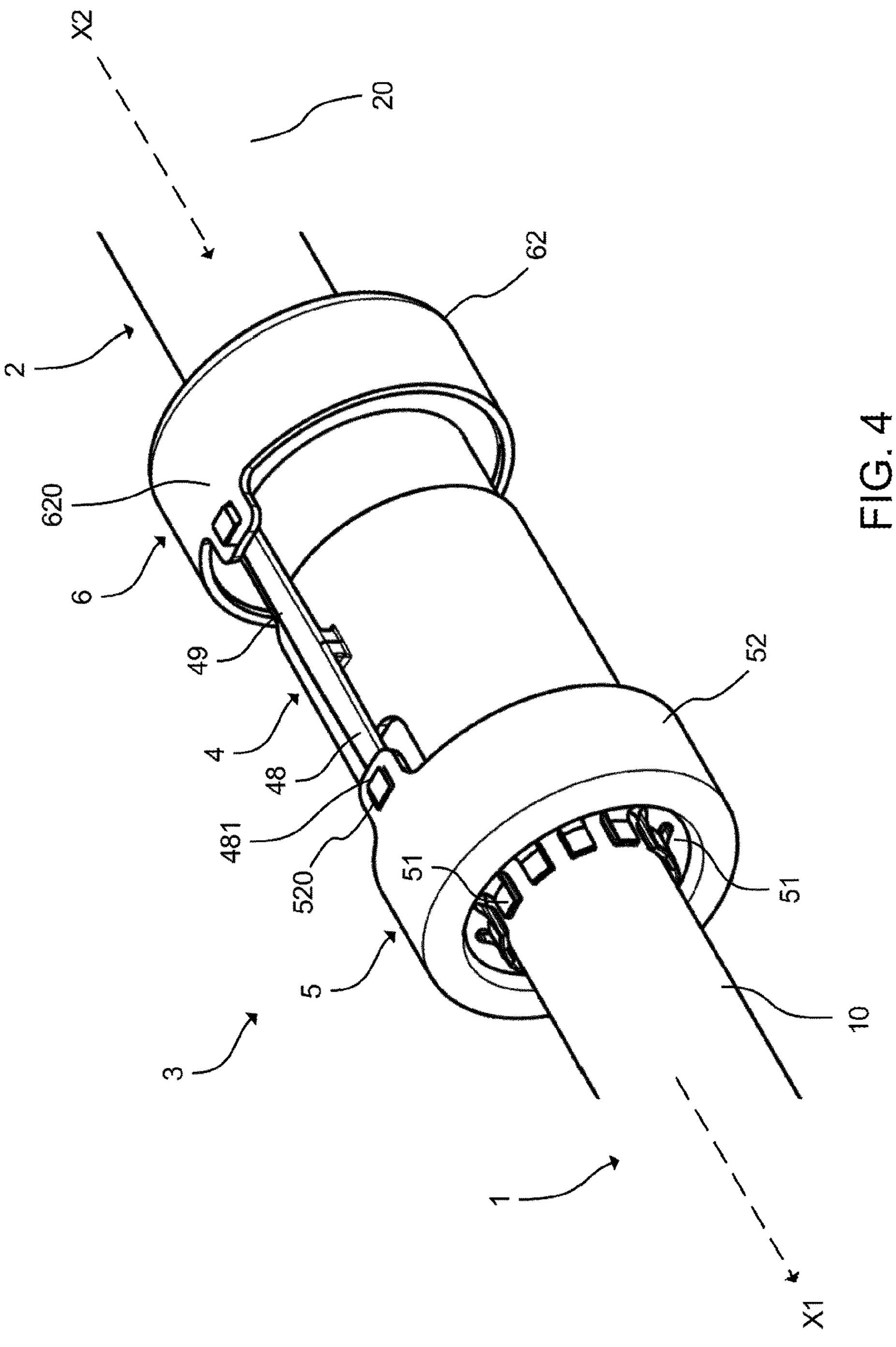
FIG. 4 is a schematic perspective representation of two pipes with a connector according to the invention in the connection position.

With reference to FIG. 4, one embodiment of a fluid circuit according to the invention is represented which comprises a first pipe 1, a second pipe 2 and a linking connector 3 mounted at the interface between the first pipe 1 and the second pipe 2, in order to fluidically connect the first pipe 1 to the second pipe 2.

In this embodiment, each pipe comprises a tubular body which is terminated at each end by a connection end. The tubular body of each pipe preferably comprises bent portions so as to allow the fluid circuit to conveniently link different pieces of equipment by overcoming positioning restrictions. In addition, each pipe defines an internal surface, in contact with the fluid to be conveyed, and an external surface, opposite to the internal surface.

Figure 5:
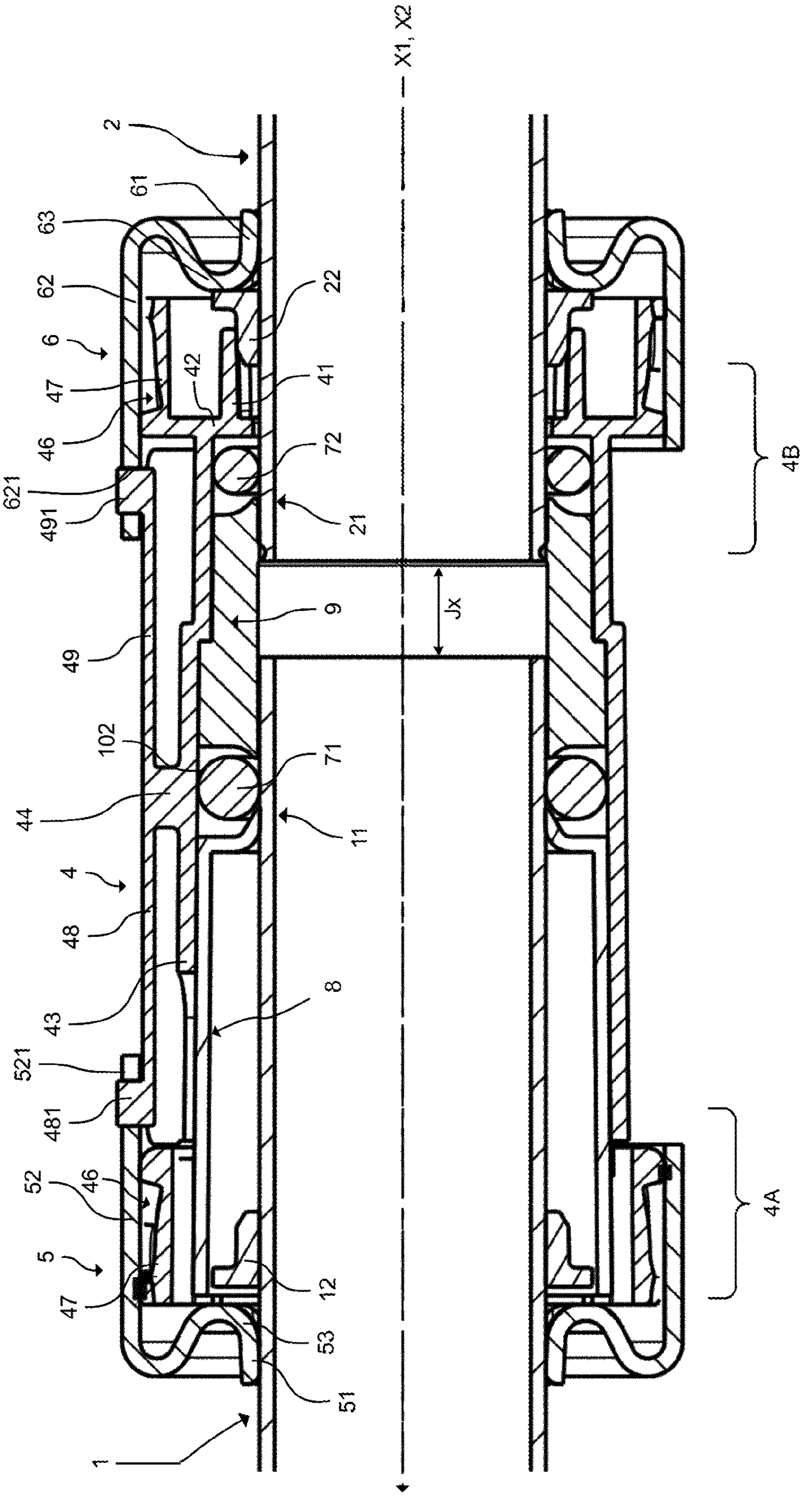
FIG. 5 is a schematic longitudinal cross-sectional representation of FIG. 5.

With reference to FIG. 5, the first pipe 1 comprises a first connection end 11, extending along a first axis X1 and defining an internal surface and an external surface. The first connection end 11 comprises a first connection element 12, in particular, an L-shaped peripheral connection ring.

Analogously, still with reference to FIG. 5, the second pipe 2 comprises a second connection end 21, extending along a second axis X2 and defining an internal surface and an external surface. The second connection end 21 comprises a second peripheral connection element 22, in particular, a connection ring. The axes X1, X2 are preferably aligned but can be offset by an angular offset of up to 10° or a vertical/lateral offset of up to 10 mm.

Preferably, the connection rings 12, 22 are split rings, still preferably, each connection ring 12, 22 has an L-shaped cross section. Pipes 1, 2 have analogous structures to enable industrialization at lower costs. It goes without saying that the connection elements 12, 22 could be in other forms, in particular a castellated crown or a lug. Preferably, each connection element 12, 22 has an axial thickness in the order of 2 mm and a radial length of between 4 mm and 8 mm relative to the axis X1, X2.

In this embodiment, as illustrated in FIG. 5, the distance between the first connection element 12 and the end edge of the first pipe 1 is greater than the distance between the second connection element 22 and the end edge of the second pipe 2. This advantageously makes it possible to pre-mount the linking connector 2 between the first peripheral connection element 12 and the end edge of the first pipe 1 as will be set forth later. Thus, it is sufficient to translate the linking connector 3 housed on the first pipe 1 to ensure sealing with the second pipe 2.

It goes without saying that each connection end 11, 21 could also be formed by a connection end cap which would be mounted in an add-on manner with its connection element 21, 22.

As illustrated in FIG. 5, the connection ends 11, 21 of the pipes 1, 2 are fixed and spaced apart by an axial connection clearance Jx, of between 5 mm and 10 mm, which is filled by the movement of the linking connector 3 as will be set forth later.

Each pipe 1, 2 has a tubular body which comprises one or more bent portions. The diameter of the tubular body and/or of each connection end is preferably between 12.7 mm and 50.8 mm. Preferably, each pipe 1, 2 is made of plastic material, but it goes without saying that other materials may be suitable, for example, a metal material. For a metal design, the linking connector 3 preferably comprises a metallization in order to ensure electrical conductivity. Preferably, the central sleeve 4, the flexible teeth 41 and the linking members 5, 6 comprise a metallization, for example, at least one metallization strip.

In FIG. 5, the axes X1, X2 are oriented from right to left. As will be set forth in the example implementation, the linking connector 3 allows the two pipes 1, 2 which are spread apart to be placed in fluid communication.

The first pipe 1 further comprises a first linking member 5, translationally and rotationally free about the first axis X1, configured to cooperate with a first end of the linking connector 3. Analogously, the second pipe 2 further comprises a second linking member 6, translationally and rotationally free about the second axis X2, configured to cooperate with a second end of the linking connector 3. In other words, the linking members 5, 6 allow immobilizing and securing the position of the linking connector 3. The linking members 5, 6 are not positioned between the connection elements 12, 22 but externally to the latter. Preferably, the linking members 5, 6 are mounted captively to the connection ends 11, 21 so as to avoid their loss when handling a pipe 1, 2. Thus, the first linking member 5 is mounted to the left of the first connection element 12 while the second linking member 6 is mounted to the right of the second connection element 22. The structure and function of the linking members 5, 6 will be set forth later.

As will be set forth later, the first linking member 5 and the central sleeve 4 are pre-mounted to the first pipe 1 while the second linking member 7 is pre-mounted to the second pipe 2. The first linking member 5 is linked to the central sleeve 4 during premounting, in particular in the workshop, while the second linking member 6 is linked to the central sleeve 4 in situ, in particular in an aircraft.

Still with reference to FIG. 5, the fluid circuit comprises a linking connector 3 configured to mechanically link the two connection ends 11, 21. The linking connector 3 comprises a central sleeve 4, a first sealing member 71, a second sealing member 72, a first spreader 8 and a second spreader 9.

In this exemplary embodiment, the central sleeve 4 is configured to extend externally to the connection ends 11, 21 in order to ensure a fluidic connection between the pipes 1, 2. The central sleeve 4 is configured to compress the sealing members 71, 72 in order to ensure sealing between the connection ends 11, 21. The central sleeve 4 has an internal diameter slightly smaller than that of the sealing members 71, 72, so as to compress the same radially.

Figure 6:
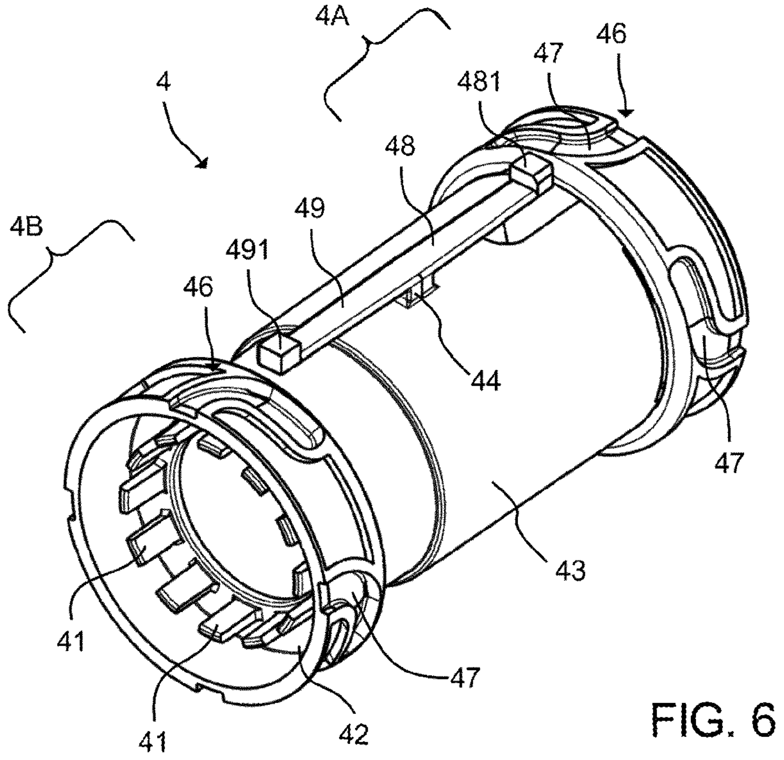
FIG. 6 is a schematic perspective representation of a central sleeve according to the invention.

As illustrated in FIGS. 5 and 6, the central sleeve 4 is in the form of a peripheral casing that axially extends along the first axis X1. In the mounted position, the central sleeve 4 is adapted to slide along the first axis X1 on the connection end 11 of the first pipe 1. With reference to FIG. 6, the central sleeve 4 comprises a first portion 4A intended to extend to the side of the first pipe 1 in the locked position and a second portion 4B intended to extend to the side of the second pipe 2 in the locked position.

Figure 7:
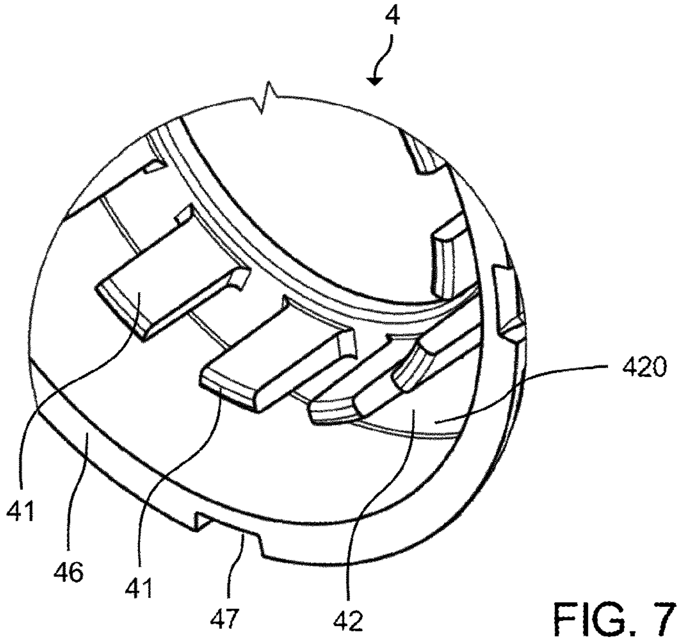
FIG. 7 is a schematic close-up representation of the flexible teeth of the central sleeve of FIG. 6.

The central sleeve 4 comprises, at the second portion 4B, a plurality of flexible teeth 41 configured to cooperate with the second connection element 22 in order to correct a possible misalignment between the first axis X1 and the second axis X2. The flexible teeth 41 extend in parallel to the first axis X1 and have the same axial position so as to form a castellated crown. In this example, with reference to FIG. 7, each flexible tooth 41 has a length of between 2 mm and 20 mm, in order to allow angular clearance of less than or equal to 10°. The flexible teeth 41 are spread apart from each other, in particular in a distributed manner.

With reference to FIG. 5, the flexible teeth 41 are aligned radially with the second sealing member 72 so as to allow the flexible radial teeth 41 to move the second sealing member 72 during a longitudinal movement of the central sleeve 4 towards the first pipe 1.

The central sleeve 4 comprises, at the second portion 4B, a radial crown 42 extending externally to the flexible teeth 41 and advantageously enabling the central connector 4 to be handled without damaging the flexible teeth 41.

With reference to FIGS. 5 and 6, the first portion 4A of the central sleeve 4 is linked to the second portion 4B by a substantially cylindrical sheath 43 in which the sealing members 71, 72 and the spreaders 8, 9 are housed.

The central sleeve 4 comprises, at each portion 4A, 4B, a clamping device 46 configured to cooperate with a linking member 5, 6. In this example, with reference to FIG. 6, each clamping device 46 comprises a plurality of guide slots 47, formed at the periphery of the clamping device 46, to allow axial blocking following angular rotation of a linking member 5, 6, especially quarter-turn clamping. It goes without saying that other clamping means may be suitable, in particular, a screw pitch.

The central sleeve 4 further comprises a first locking member 48 configured to cooperate with the first linking member 5 and a second locking member 49 configured to cooperate with the second linking member 6. Such locking devices 48, 49 make it possible to prevent any unintentional removal of the linking members 5, 6.

As illustrated in FIGS. 5 and 6, the locking members 48, 49 extend longitudinally along the first axis X1 radially externally to the sleeve 43. The locking members 48, 49 are linked by a radial wall 44 to the sheath 43 allowing each locking member 48, 49 to be able to tilt towards the center of the central sleeve 4 relative to the first axis X1 in order to cooperate with a linking member 5, 6. The locking members 48, 49 respectively comprise, at their free ends, locking teeth 481, 491 radially protruding outwards so as to be able to be introduced into a through-hole of a linking member 5, 6.

Preferably, the central sleeve 4 is unitary, that is, formed as one-piece, which makes it possible to dispense with a mechanical hinge that could wear out or represent a fragile zone. Preferably, the central sleeve 4 is made of a thermoplastic material.

In this embodiment, with reference to FIG. 5, the linking connector 3 comprises a first sealing member 71 and a second sealing member 72 to ensure sealing with the central sleeve 4 respectively with the first connection end 11 and the second connection end 21. Each sealing member 71, 72 has a toric shape and is made of an elastic material.

In this example, the first sealing member 71 has a larger diameter than the second sealing member 72 so as to allow tilting of the linking connector 3 with respect to the first axis X1.

Still with reference to FIG. 5, the linking connector 3 comprises a first spreader 8, positioned between the first linking member 11 and the first sealing member 71 and a second spreader 9 positioned longitudinally between the two sealing members 71, 72.

The first spreader 8 and the second spreader 9 advantageously make it possible to hold the sealing members 71, 72 and move them together when moving the central sleeve 4. To this end, the longitudinal ends of the second spreader 9 are curved so as to fit closely the shape of sealing members 71, 72 of circular cross section.

When moving the central sleeve 4 to the right (towards the second pipe 2), the first linking member 5 moves the first spreader 8 which moves the first sealing member 71 which moves the second sealing member 72 by means of the second spreader 9. Thus, the sealing members 71, 72 are moved concomitantly, which ensures optimum sealing when setting up or removing the linking connector 3.

In order to hold the linking connector 3 in the connection position between the connection ends 11, 21, the linking members 5, 6 lock the central sleeve 4. In this embodiment, the linking members 5, 6 are identical and only the first linking member 5 will be set forth later for clarity and conciseness.

Figure 8:
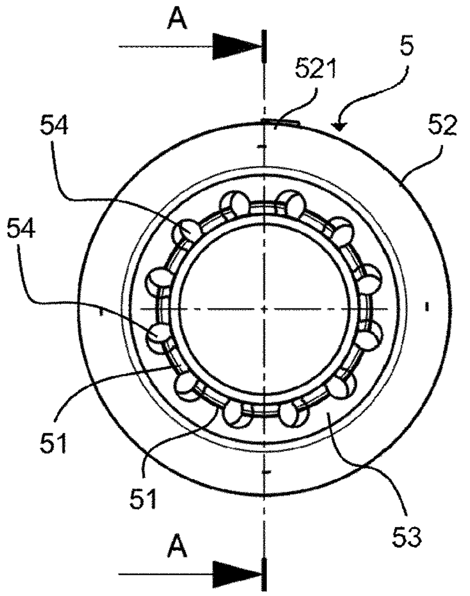
FIG. 8 is a schematic front representation of a linking member according to the invention.
Figure 9:
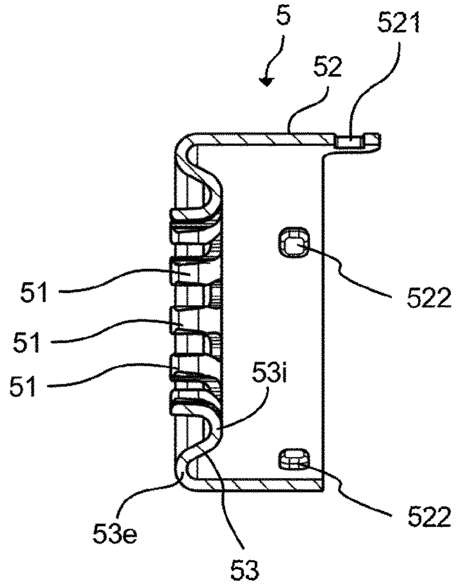
FIG. 9 is a schematic representation in a cross-section A-A of the linking member of FIG. 8.

With reference to FIGS. 8 and 9, the first linking member 5 comprises a plurality of flexible teeth 51 configured to cooperate with the external surface of the first pipe 1 in order to correct a possible misalignment between the first axis X1 and the second axis X2. The flexible teeth 51 extend in parallel to the first axis X1 and have the same axial position. In this example, the flexible teeth 51 are substantially analogous to the flexible teeth 41 previously set forth and are arranged to form a crown.

With reference to FIG. 8, the flexible teeth 51 are spread apart by cylindrically shaped openings 54 in order to avoid stress concentration.

The flexible teeth 51 are linked to an external annular crown 52 via a linking portion 53. In this example, the linking portion 53 has a corrugated cross section, preferably S-shaped, so as to increase flexibility and allow relative tilt between the flexible teeth 51 (which align with the first axis X1) and the external annular crown 52 which aligns with the central sleeve 4 along the second axis X2.

Preferably, the openings 54 are formed in the linking portion 53 configured, on the one hand, to make an elastic link in order to withstand strains and, on the other hand, to ensure sufficient rigidity to allow realignment of the axes X1, X2. With reference to FIG. 9, to this end, the linking portion 53 has a thickness in the order of 1 to 2 mm, an external elbow 53*e* having a radius of curvature of between 2 mm and 3 mm and an internal elbow 53*i* having a radius of curvature of between 1 mm and 2 mm. Preferably, each flexible tooth 51 is tilted towards the axis by an angle of between 2° and 5° so as to come into contact with the external surface of the first pipe 1 and correct its orientation by putting a strain on the linking portion 53.

The external annular crown 52 has a through-hole 521 for receiving the locking tooth 481 of the first locking member 48 of the central sleeve 4. The external annular crown 52 further comprises a plurality of internal radial fingers 522, angularly distributed, configured to be guided into the guide slots 47 of the guide device 46 formed on the central sleeve 4 in order to allow axial clamping.

Analogously, the second linking member 6 comprises a plurality of flexible teeth 61 configured to cooperate with the external surface of the second pipe 2. The flexible teeth 61 extend in parallel to the second axis X2.

The linking connector 3 according to the invention comprises a very limited number of elements in this embodiment, which reduces its cost. Furthermore, advantageously, each element can be made at low cost, in particular by plastic injection, which especially reduces its mass.

Figure 10:
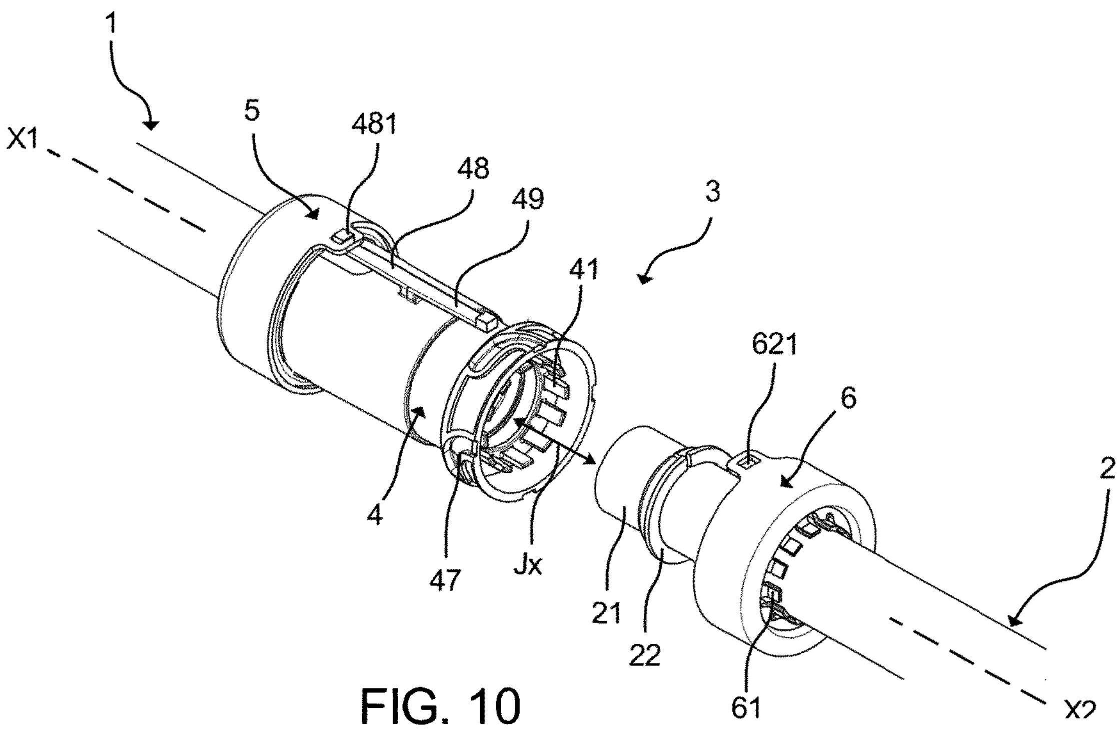
FIG. 10 is a schematic representation of a fluid circuit before connection.

According to a preferred aspect of the invention, the linking connector 3 is pre-mounted at the connection end 11 of the first pipe 1 by means of the first linking member 5 as illustrated in FIG. 10. The second linking member 6 is not connected. In this pre-mounting position, the sealing members 71, 72 are in contact with the first connection end 11 and the first linking member 5 is positioned very far to the left of the first connection element 12.

Such pre-mounting is very advantageous as it avoids the need for an operator to use add-on parts to connect the two pipes 1, 2. The first pipe 1 can thus be easily handled with its linking connector 3. Indeed, the linking connector 3 can be closed and secured directly. Pre-mounting advantageously allows the linking connector 3 to be positioned when the pipes 1, 2 are attached to an aircraft structure, which provides significant time savings. However, it goes without saying that linking connector 3 could be retrofitted.

A method for connecting a first pipe 1 and a second pipe 2 by means of a linking connector 3 according to one embodiment of the invention will now be set forth. In this example, the pipes 1, 2 have been previously made integral with a structure of an aircraft and are not movable with respect to each other.

With reference to FIG. 10, the connection ends 11, 21 of the pipes 1, 2 are fixed and spaced apart by an axial connection clearance Jx, the linking connector 3 is pre-mounted to the connection end 11 of the first pipe 1 as explained previously.

Figure 11:
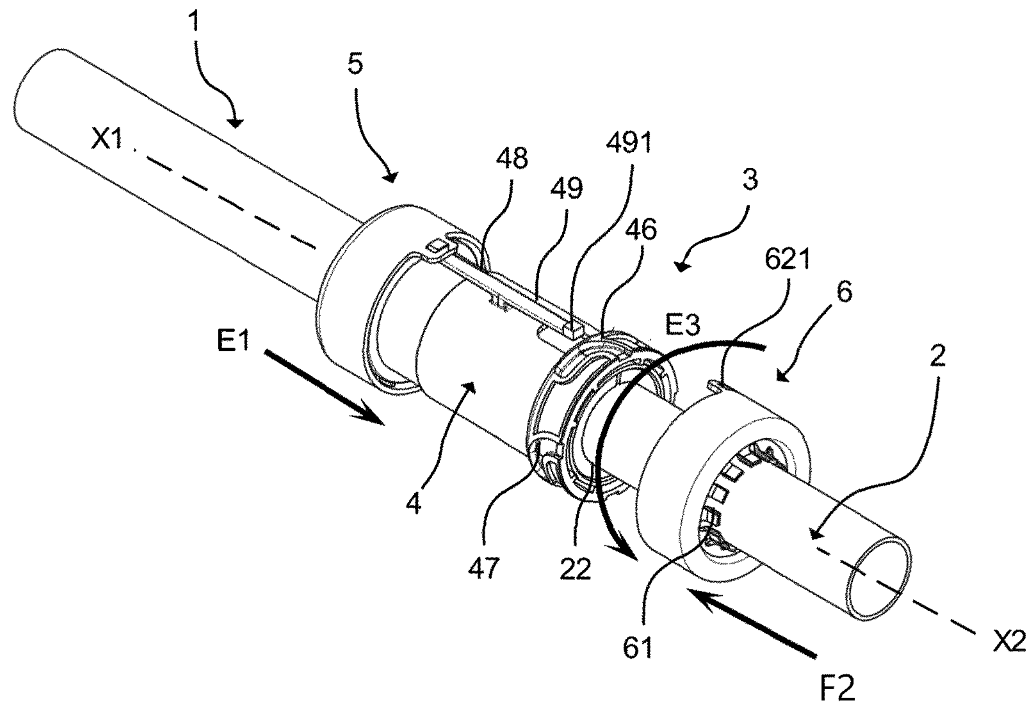
FIG. 11 is a schematic representation of the fluid circuit of FIG. 10 after moving the central sleeve.

In order to make a connection, with reference to FIG. 11, the method comprises a step of axially moving E1 the linking connector 3 along the first axis X1 until it extends to the interface between the two connection ends 11, 21 of the pipes 1, 2. Advantageously, this movement can be carried out by an operator using only one of their hands, which is convenient. Such a motion is simple to carry out since the operator only needs to move the central sleeve 4 to the right so as to move the first sealing member 71 and the second sealing member 72 to ensure sealing with the first connection end 11 and the second connection end 21 by means of the spreaders 8, 9.

Following the translational movement along the first axis X1, the flexible teeth 41 of the central sleeve 4 cooperate with the second connection element 22 of the second pipe 2 which extends along the second axis X2. Advantageously, any misalignment is compensated for by the flexible teeth 41.

Finally, with reference to FIG. 11, the second linking member 6 is moved to the left (step E2) so as to cooperate with the central sleeve 4 by quarter-turn screwing (step E3) in order to make a pull of the central sleeve 4 to the right in order to immobilize the linking connector 3 stably between the connection elements 12, 22 (FIG. 5). The locking tooth 491 of the second locking member 4 of the central sleeve 4 cooperates with the through opening 621 of the second linking member 6. Advantageously, the flexible teeth 61 of the second linking member 6 also make it possible to compensate for misalignment between the central sleeve 4 and the second pipe 2.

Advantageously, even if the pipes 1, 2 are not perfectly rectilinear, they can still be connected sealingly and durably. By means of the invention, two pipes 1, 2 can be connected physically and fluidly by an operator without risk of error and conveniently.

The invention claimed is:

1. A fluid circuit, for an aircraft, comprising at least one first pipe comprising a first connection end, extending along a first axis and defining an internal surface and an external surface, the first connection end comprising a first peripheral connection element as well as a first linking member translationally and rotationally free about the first axis, at least one second pipe comprising a second connection end, extending along a second axis and defining an internal surface and an external surface, the second connection end comprising a second peripheral connection element as well as a second linking member translationally and rotationally free about the second axis, the connection ends of the at least one first and second pipes being fixed and spaced apart by an axial connection clearance, a linking connector, to sealingly link the first and second connection ends, comprising: a central sleeve comprising a peripheral casing adapted to slide along the second axis, the central sleeve being configured to cooperate, at a first end, with the first linking member and, at a second end, with the second linking member, and the central sleeve comprising a plurality of flexible teeth configured to cooperate with the second peripheral connection element for correcting a misalignment between the first axis and the second axis; and wherein the first linking member comprises a plurality of flexible teeth configured to cooperate with the first connection end for correcting a misalignment between the first axis and the second axis during the cooperation of the first linking member with the central sleeve.

2. The fluid circuit according to claim 1, wherein the flexible teeth of the central sleeve are circumferentially distributed.

3. The fluid circuit according to claim 1, wherein the first linking member comprises a corrugated linking portion linking the flexible teeth.

4. The fluid circuit according to claim 3, wherein the first linking member comprises openings formed in the corrugated linking portion to spread the flexible teeth apart.

5. The fluid circuit according to claim 3, wherein the linking portion has an external elbow having a first radius of curvature and an internal elbow having a second radius of curvature less than the first radius of curvature.

6. The fluid circuit according to claim 1, wherein the first linking member and the second linking member are identical.

7. The fluid circuit according to claim 1, wherein at least one end of the central sleeve comprises a clamping device configured to cooperate with a linking member.

8. The fluid circuit according to claim 1, wherein the clamping device comprises at least one guide slot to allow quarter-turn clamping.

9. The fluid circuit according to claim 1, wherein the linking connector comprises a first sealing member and a second sealing member configured to cooperate respectively with the first connection end and the second connection end in the connection position.

10. An aircraft comprising a fluid circuit according to claim 1, wherein the at least one first pipe and the at least one second pipe are made integral with a structure of the aircraft, the first and second connection ends of the at least one first and second pipes being fixed and spaced apart by an axial connection clearance.

11. A method for connecting at least a first pipe and a second pipe using a linking connector of a fluid circuit according to claim 1, the first and second connection ends of the at least one first and second pipes being fixed and spaced apart by an axial connection clearance, the method comprising:

a step of moving the central sleeve of the linking connector between the connection first and second ends, the flexible teeth of the central sleeve cooperating with the second peripheral connection element to correct a misalignment between the first axis and the second axis.

12. The connecting method according to claim 11, further comprising a step of cooperating of the second linking member with the central sleeve to lock the linking connector.

13. A fluid circuit for an aircraft comprising a first pipe comprising a first connection end extending along a first axis and defining an internal surface and an external surface, the first connection end comprising a first peripheral connection element and a first linking member translationally and rotationally free about the first axis;

a second pipe comprising a second connection end extending along a second axis and defining an internal surface and an external surface, the second connection end comprising a second peripheral connection element and a second linking member translationally and rotationally free about the second axis; wherein the first connection end and the second connection end are located adjacent one another in a spaced relationship with an axial connection clearance gap therebetween;

a linking connector to sealingly link the first and second connection ends, the linking connector comprising:

a central sleeve comprising a peripheral casing having a first end and a second end, the central sleeve adapted to slide along the second axis and cooperate at the first end with the first linking member and at the second end with the second linking member; the central sleeve comprising a plurality of flexible tooths defining flexible teeth at the second end to cooperate with the second peripheral connection element for correcting a misalignment between the first axis and the second axis; and a sealing member made from an elastic material for forming a seal compressed by the central sleeve against the first pipe or the second pipe.

14. The fluid circuit according to claim 13, wherein the sealing member is a first sealing member and is compressed against the first pipe and further comprising a second sealing member compressed by the central sleeve and the second pipe.

15. The fluid circuit according to claim 14, wherein the first sealing member has a first diameter and the second sealing member has a second diameter, and wherein the first diameter is larger than the second diameter.

16. The fluid circuit according to claim 13, wherein the central sleeve and the first linking member cooperate by engaging a locking tooth with a through opening.

17. The fluid circuit according to claim 13, wherein the first linking member has flexible teeth pressed against the external surface of the first pipe.

18. The fluid circuit according to claim 13, wherein the second linking member has flexible teeth pressed against the external surface of the second pipe.

19. A fluid circuit, for an aircraft, comprising at least one first pipe comprising a first connection end, extending along a first axis and defining an internal surface and an external surface, the first connection end comprising a first peripheral connection element as well as a first linking member translationally and rotationally free about the first axis, at least one second pipe comprising a second connection end, extending along a second axis and defining an internal surface and an external surface, the second connection end comprising a second peripheral connection element as well as a second linking member translationally and rotationally free about the second axis, the connection ends of the at least one first and second pipes being fixed and spaced apart by an axial connection clearance, a linking connector, to sealingly link the first and second connection ends, comprising: a central sleeve comprising a peripheral casing adapted to slide along the second axis, the central sleeve being configured to cooperate, at a first end, with the first linking member and, at a second end, with the second linking member, and the central sleeve comprising a plurality of flexible teeth configured to cooperate with the second peripheral connection element for correcting a misalignment between the first axis and the second axis;

wherein each flexible tooth is tilted towards the first axis by an angle of between 2° and 5°.

* * * * *